United States Patent Office 3,576,616
Patented Apr. 27, 1971

3,576,616
HERBICIDAL COMPOSITIONS AND METHODS
Kurt A. Nowotny, Camas, Wash., assignor to
Monsanto Company, St. Louis, Mo.
No Drawing. Continuation-in-part of abandoned application Ser. No. 655,763, July 25, 1967. This application May 15, 1969, Ser. No. 825,077
Int. Cl. A01n 9/22
U.S. Cl. 71—94
13 Claims

ABSTRACT OF THE DISCLOSURE

Herbicidal compositions comprising pyridines of the formula

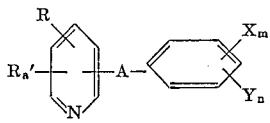

wherein A is selected from the group consisting of O and S; X and Y are each selected from the group consisting of fluorine, chlorine and bromine; R is selected from the group consisting of fluorine, chlorine, bromine, nitro and amino; $a$ is an integer 0 or 1; $m$ is an integer from 0 to 3; $n$ is an integer from 1 to 2; R' is selected from the group consisting of chlorine, bromine, fluorine, and amino; and the acid addition salts thereof.

---

This application is a continuation-in-part of my application Ser. No. 655,763 filed July 25, 1967 and now abandoned.

This invention relates to phytotoxic compositions and to methods of controlling the growth of plants.

The term "plant" as used herein and in the appended claims is inclusive of dormant seeds, germinant seeds, germinative seeds, emerging seedlings and established woody and herbaceous vegetation including the roots and above-ground portions.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combinations thereof.

The heribicidal compositions of this invention comprise an adjuvant and at least one compound selected from the group consisting of a pyridine base and acid addition salts thereof, said pyridine base having the formula

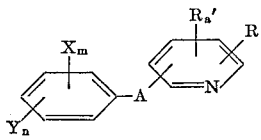

wherein A is selected from the group consisting of O and S; X and Y are each selected from the group consisting of fluorine, chlorine and bromine; R is selected from the group consisting of fluorine, chlorine, bromine, nitro and amino; $a$ is an integer 0 or 1; $m$ is an integer from 0 to 3; $n$ is an integer from 1 to 2; R' is selected from the group consisting of chlorine, bromine, fluorine, and amino; and the acid addition salts thereof.

Acids which can be used in the preparation of the acid addition salts of the above pyridines include, but is not limited to inorganic acids such as hydrochloric acids, hydrobromic acid, sulfuric acid, phosphoric acid, nitric acid and the like, and organic acids such as acetic acid, trichloracetic acid, benzoic acid, 2,4 - dinitrobenzoic acid, succinic acid, tartaric acid, phthalic acid and the like.

Preferred compounds of this invention are the pyridine bases in which A is oxygen; X and Y are chlorine or bromine; R is chlorine, bromine or nitro; R' is chlorine or bromine; sum of $m$ plus $n$ is a maximum of three; and $a$, $m$ and $n$ are as previously defined.

For the sake of brevity and simplicity, the term "active ingredient" is used hereinafter in this specification to describe the herbicidal halogenated phenoxy- and phenylmercaptopyridines useful in the compositions and methods of this invention.

In practicing the herbicidal methods of this invention, the active ingredients can be used alone or in combination with a material referred to in the art as an adjuvant in liquid or solid form. Herbicidal compositions are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as a finely-divided particulate solid, a liquid of organic origin, water, a wetting agent, dispersing agent, an emulsifying agent or any suitable combination of these. The herbicidal compositions usually contain from about 0.01 percent to about 99 percent by weight of active ingredient.

Typical finely-divided solid carriers and extenders which can be used with the active ingredients include for example, the talcs, clays, pumice, silica, diatomaceous earth, quartz, fuller's earth, salt, sulfur, powdered cork, powdered wood, ground corn cobs, walnut flour, chalk, tobacco dust, charcoal, volcanic ash, cottonseed hulls, wheat flour, soybean flour, tripoli and the like. Typical liquid diluents include for example, kerosene, Stoddard solvent, hexane, water, benzene, toluene, acetone, ethylene, dichloride, xylene, alcohols, Diesel oil, glycols and the like.

Herbicidal compositions, particularly liquids and wettable particles, usually contain as a conditioning agent one or more surface-active agents in amounts sufficient to render a given composition readily dispersible in water or in oil. By the term "surface-active agent" is it understood that wetting agents, dispersing agents, suspending agents and emulsifying agents are included therein.

The term "herbicidal composition" as used herein and in the appended claims is intended to mean not only compositions in a suitable form for application but also concentrated compositions which require dilution or extension with a suitable quantity of liquid or solid adjuvant prior to application.

The following examples will illustrate the invention. In these examples, as well as in the specification and appended claims, parts and percent are by weight unless otherwise indicated.

EXAMPLE 1

The herbicidal activity of the active ingredients of this invention is demonstrated as follows: A good grade of top soil is placed in aluminum pans and compacted to a depth of ½" from the top of each pan. A pre-determined number of seeds of each of various plant species are placed on top of the soil in each pan. The soil required to fill a pan is weighed and admixed with a herbicidal composition containing a sufficient amount of active ingredient to obtain the desired rate of active ingredient per acre. The pans are then filled with the various admixtures and leveled.

The seed containing pans are placed on a wet sand bench and maintained under ordinary conditions of sulight and watering. The plants are observed at the end of approximately 14 days and the results recorded. The herbicidal activity index is based on the average percent control of each seed lot. The herbicidal activity index is converted to a relative numerical scale for the sake of brevity and simplicity in the tables.

The herbicidal activity index used is defined as follows:

| Average percent control: | Numerical scale |
|---|---|
| 0 to 25 | 0 |
| 26 to 50 | 1 |
| 51 to 75 | 2 |
| 76 to 100 | 3 |

In Table I, the various plant species are represented by letters as follows:

| | |
|---|---|
| C—Morning Glory | K—Foxtail |
| D—Wild Oats | L—Barnyard Grass |
| E—Brome Grass | M—Crab Grass |
| F—Rye Grass | N—Pigweed |
| G—Radish | O—Soybean |
| H—Sugar Beets | P—Wild Buckwheat |
| I—Cotton | Q—Tomato |
| J—Corn | R—Sorghum |

TABLE I.—PRE-EMERGENT HERBICIDAL ACTIVITY

| Compound | Rate, lb./acre | C | D | E | F | G | H | I | J | K | L | M | N | O | P | Q | R |
|---|---|---|---|---|---|---|---|---|---|---|---|---|---|---|---|---|---|
| 1 | 10 | 2 | 3 | 3 | 3 | 2 | 2 | | 3 | | 3 | 3 | 0 | 1 | 2 | 3 |
| 2 | 10 | 2 | 3 | 3 | 3 | 2 | 1 | | 3 | | 3 | 3 | 1 | 2 | 2 | 3 |
| 3 | 10 | 2 | 3 | 3 | 3 | 1 | 2 | | 3 | | 3 | 3 | 0 | 1 | 2 | 3 |
| 4 | 5 | 3 | 3 | 3 | 3 | 3 | 3 | 1 | 3 | 3 | 3 | 3 | 3 | 1 | 2 | 2 | 3 |
| 5 | 10 | 0 | 0 | 2 | 2 | 0 | 2 | | 3 | | 3 | 3 | 1 | 2 | 0 | 3 |

NOTE:
Compound 1=4-(3'chlorophenoxy)-2-bromopyridine.
Compound 2=4-(3'-chlorophenoxy)-2-chloropyridine.
Compound 3=4-(2',4',5'-trichlorophenoxy)-2-chloropyridine.
Compound 4=3-(3'-chlorophenoxy)-5-chloropyridine.
Compound 5=5-(2',4',6'-trichlorophenoxy)-2-nitropyridine.

While carrying out the above and other pre-emergent tests with the active ingredients of this invention, numerous specific plant growth responses were observed and recorded. Some of the observed plant growth responses are given in Table II.

TABLE II

| Compound | Rate | Response |
|---|---|---|
| 3-(2,4-dibromophenoxy)-5-chloropyridine. | 10 | Stunting of broadleaf species. Tillering of grasses. |

The post-emergent plant growth regulant activity of representative active ingredients of this invention is demonstrated as follows. The active ingredients are applied in spray form to 21-day old specimens of many of the same plant species used in the preceding pre-emergent tests. The spray is an acetone-water solution containing 0.5% active ingredient. The solution is applied to the plants in different sets of pans at a rate equal to approximately 10 pounds of active ingredient per acre. The treated plants are placed in a greenhouse and the effects are observed and recorded after approximately 14 days.

The post-emergent herbicidal activity index used in Table III is measured by the average percent control of each plant species and is defined as follows

| Average percent control: | Numerical scale |
|---|---|
| 0 to 25 | 0 |
| 26 to 50 | 1 |
| 51 to 75 | 2 |
| 76 to 99 | 3 |
| 100 | 4 |

The identification of the plants used is the same as in the preceding pre-emergent tests. Results and further details are given in Table III.

The active ingredients of this invention are particularly useful for the control of weed plants in the presence of cotton and soybeans.

Examples of other active ingredients useful in this invention include:

3-(2'-fluorophenoxy)-5-bromopyridine
4-(2'-chlorophenoxy)-2-chloropyridine
6-(2',4'-dichlorophenoxy)-2-chloropyridine
6-(3',5'-dichlorophenoxy)-2-chloropyridine
3-(2',4',6'-trichlorophenoxy)-2-chloropyridine
5-(3'-chlorophenoxy)-3-chloropyridine
5-(2',4'-dibromophenoxy)-3-chloropyridine
5-(2',4'-dichlorophenoxy)-3-chloropyridine
6-(2',4',6'-trichlorophenoxy)-3-chloropyridine
5-(2',4',6'-trichlorophenoxy)-3-chloropyridine
2-(3'-chlorophenoxy)-5-nitropyridine
6-(2',4',6'-trichlorophenoxy)-3-nitropyridine
6-(2',3',4',5',6'-trichlorophenoxy)-3-nitropyridine
5-(2',4',6'-trichlorophenoxy)-2-aminopyridine
6-(2',4',6'-trichlorophenoxy)-3-aminopyridine
3-(2'-fluoropyhenylmercapto)-5-bromopyridine
4-(2'-chloro-4'-bromophenoxy)-2-chloropyridine
6-(2',4'-dichlorophenylmercapto)-2-nitropyridine
3-(3'-fluorophenoxy)-2-nitropyridine
3-(3'-fluorophenoxy)-5-nitropyridine
3-(3'-fluorophenylmercapto)-5-nitropyridine
3-(4'-fluorophenoxy)-2-chloropyridine
3-(4'-fluorophenoxy)-2-fluoropyridine
3-(4'-fluorophenoxy)-2-bromopyridine
3-(2'-bromophenoxy)-2-bromopyridine
3-(2'-bromophenoxy)-2-aminopyridine
6-(2'-bromo-4'-fluorophenoxy)-3-aminopyridine
3-(2'-chlorophenoxy)-2,4-dichloropyridine
3-(3',4'-dichlorophenoxy)-5-chloropyridine
3-(3',4'-dichlorophenylmercapto)-5-chloropyridine
2-(3',4'-dichlorophenoxy)-5,6-dichloropyridine
3-(3',4'-dichlorophenylmercapto)-5,6-dichloropyridine
3-(3',5'-dichlorophenoxy)-5-bromopyridine
3-(3',5'-dichlorophenylmercapto)-5-bromopyridine
3-(2'-bromophenoxy)-5-chloropyridine
3-(2'-bromophenylmercapto)-5-chloropyridine
3-(3'-bromophenoxy)-3,5-dichloropyridine
4-(3'-bromophenylmercapto)-3,5-dichloropyridine
3-(4'-bromophenoxy)-2-bromopyridine
3-(4'-bromophenylmercapto)-2-bromopyridine
3-(2',4'-dibromophenoxy)-2-bromo-pyridine
3-(2',4'-dibromophenylmercapto)-2-nitro-pyridine
3-(2',3',4',5',6'-pentabromophenoxy)-2-chloropyridine
2-(2',3',4',5',6'-pentabromophenylmercapto)-2-bromopyridine
3-(2',3',4',5',6'-pentafluorophenoxy)-2-nitropyridine
3-(2',3',4',5',6'-pentafluorophenylmercapto)-2-aminopyridine

TABLE III.—POST-EMERGENT HERBICIDAL ACTIVITY

| Compound | Rate, lb./acre | C | D | E | F | G | H | I | J | K | L | M | N | O | P | Q | R |
|---|---|---|---|---|---|---|---|---|---|---|---|---|---|---|---|---|---|
| 3-(2',4'-dibromophenoxy)-5-chloropyridine | 10 | 1 | 3 | 3 | 1 | 3 | 3 | | 4 | | 3 | 4 | 0 | 2 | 4 | 3 |
| 4-(2',4'-6'-trichlorophenoxy)-2-chloropyridine | 10 | 3 | 2 | 2 | 2 | 3 | 3 | | 3 | | 3 | 4 | 2 | 3 | 4 | 2 |

As mentioned hereinbfore the active ingredients of this invention can be admixed with one or more adjuvants which can be solid or liquid extenders, carriers, diluents, conditioning agents and the like. Preferred herbicidal compositions containing the active ingredients of this invention have been developed so that the active ingredients can be used to the greatest advantage to control the growth of plants. The preferred compositions comprise wettable powders, aqueous suspensions, dust formulations, granules, emulsifiable oils and solutions in solvents. In general, these preferred compositions can all contain one or more surface-active agents.

Surface-active agents which can be used in the herbicidal compositions of this invention are set out, for example in Searle U.S. Pat. 2,426,417, Todd U.S. Pat. 2,655,447, Jones U.S. Pat. 2,412,510 and Lenher U.S. Pat. 2,139,276. A detailed list of such agents is also set forth by J. W. McCutcheon in "Soap and Chemical Specialties," November 1947, page 8011 et seq., entitled "Synthetic Detergents"; "Detergents and Emulsfiers—Up to Date" (1960), by J. W. McCutcheon, Inc., and Bulletin E–607 of the Bureau of Entomology and Plant Quarantine of the U.S.D.A. In general, less than 50 parts by weight of the surface-active agent is present per 100 parts by weight of herbicidal composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylinic glycols, polyoxyethylene derivatives of alkylphenols (particularly isooctylphenol and nonylphenol) and polyoxyethylene derivatives of the mono-higher fatty esters of hexitol anhydrides (e.g. sorbitan). Preferred dispersants are methyl cellulose, polyvinyl alcohol, sodium lignin sulfonates, polymeric alkyl naphthalene sulfonates, sodium napthalene sulfonate, polymethylene bisnaphthalenesulfonate and sodium N-methyl-N-(long chain acid) taurates.

Wettable powder compositions usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total formulation. Where required from about 0.1 to 2.0 parts by weight of the solid inert extender can be replaced by a corrosion inhibitor or anti-foaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense finely divided particulate compositions which are intended for application to the soil in dry form. Dusts are characterized by their free-flowing and rapid settling properties so that they are not readily windborne to areas where they are of no value. Dusts contain primarily an active ingredient and a dense, free-flowing finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be either of vegetable or mineral origin. The solid extenders are characterized by possessing relatively low surface areas and are poor in liquid absorption. Suitable inert solid extenders for herbicidal dusts include micaceous talcs, pyrophyllite, dense kaolin clays, ground calcium phosphate rock and tobacco dust. The dusts usually contain from about 0.5 to 95 parts active ingredient, 0 to 50 parts grinding aid, 0 to 50 parts wetting agent and 5 to 99.5 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible or partially water-immiscible solvents together with a surface-active agent. Suitable solvents for the active ingredient of this invention include hydrocarbons and water-immiscible ethers, esters or ketones. Suitable surface-active agents are anionic, cationic and non-ionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 50 parts surface-active agent and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surface-active agent such as those listed hereinbefore under wettable powders can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculate, and the finely-divided clays such as kaolin clays, hydrated attapulgite or bentonitic clays. These extenders are sprayed or blended with the active ingredient to form the herbicidal formulations.

The mineral particles which are used in the herbicidal compositions usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the herbicidal compositions. The term "mesh" as used herein means U.S. Sieve Series.

The granular herbicidal compositions generally contain from about 5 parts to about 30 parts by weight of active ingredient per 100 parts by weight of clay and 0 to about 5 parts by weight of surface-active agent per 100 parts by weight of particulate clay. The preferred granular compositions contain from about 10 parts to about 25 parts by weight of active ingredient per 100 parts by weight of clay.

The herbicidal compositions can also contain other additaments, for example fertilizers, phytotoxicants, plant growth regulants, pesticides and the like used as adjuvant or in combination with any of the above-described adjuvants. Chemicals useful in combination with the active ingredients of this invention include for example triazines, ureas, carbamates, acetamides, acetanilides, uracils, acetic acids, phenols, thiolcarbamates, triazoles, benzoic acids, nitriles and the like such as:

3-amino-2,5-dichlorobenzoic acid
3-amino-1,2,4-triazole
2-methoxy-4-ethylamino-6-isopropylamino-s-triazine
2-chloro-4-ethylamino-6-isopropylamino-s-triazine
2-chloro-N,N-diallylacetamide
2-chloroallyl diethyldithiocarbamate
N'-(4-chlorophenoxy) phenyl-N,N-dimethylurea
isopropyl M-(3-chlorophenyl)carbamate
2,2-dichloropropionic acid
S-2,3-dichloroallyl N,N-diisopropylthiolcarbamate
2-methoxy-3,6-dichlorobenzoic acid
2,6-dichlorobenzonitrile
N,N-dimethyl-2,2-diphenylacetamide
6,7-dihydrodipyrido(1,2-a:2',1'-c)-pyrazidinium salt
3-(3,4-dichlorophenyl)-1,1-dimethylurea
4,6-dinitro-o-sec-butylphenol
2-methyl-4,6-dinitrophenol
ethyl N,N-dipropylthiolcarbamate
2,3,6-trichlorophenylacetic acid
5-bromo-3-isopropyl-6-methyluracil
3-(3,4-dichlorophenyl)-1-methoxy-1-methylurea
2-methyl-4-chlorophenoxyacetic acid
3-(p-chlorophenyl)-1,1-dimethylurea
2-methyl-4-chlorophenoxyacetic acid
3-(p-chlorophenyl)-1,1-dimethylurea
1-butyl-3-(3,4-dichlorophenyl)-1-methylurea
N-1-naphthylphthalamic acid
1,1'-dimethyl-4,4'-bipyridinium salt
2-chloro-4,6-bis(isopropylamino)-s-triazine
2-chloro-4,6-bis(ethylamino)-s-triazine
2,4-dichlorophenyl-4-nitrophenyl ether
alpha,alpha,alpha-trifluoro-2,6-dinitro-N,N-dipropyl-p-toluidine
S-propyl dipropylthiolcarbamate
2,4-dichlorophenoxyacetic acid
N-isopropyl-2-chloroacetanilide
2',6'-diethyl-N-methoxymethyl-2-chloroacetanilide Fertilizers useful in combination with the active ingredients include for example ammonium nitrate, urea, potash, and superphosphate. Other useful additaments include materials in which plant organisms take root and grow such as compost, manure, humus, sand and the like.

When operating in accordance with the present invention, effective amounts of the active ingredients are dispersed in or on soil or plant growth media and/or applied to above ground portions of plants in any convenient fashion. Application to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal compositions to the surface of soil or to above-ground portions of plants can be carried out by conventional methods, e.g. power dusters, boom and hand sprayers and spray dusters. The compositions can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The application of an effective amount of the active ingredients of this invention to the soil or growth media and/or plant is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment for the modification of vegetative growth, the active ingredients are applied in amounts from about 1 to about 50 or more pounds per acre. In applications to soil for the modification of the growth of germinant seeds, germinative seeds, emerging seedlings and established vegetation, the active ingredients are applied in amounts from about 0.001 to about 25 or more pounds per acre. In such soil applications, it is desirable that the active ingredients be distributed to a depth of at least 0.2 inch. In selective pre-emergence phytotoxic applications the active ingredients are usually applied in amounts from about 0.001 to 5 pounds per acre. It is believed that one skilled in the art can readily determine from the teachings of this specification, including examples, the application rate for any situation.

The terms "soil" and "growth media" are employed in the present specification and claims in their broadest sense to be inclusive of all conventional "soils" as defined in Webster's New International Dictionary, Second Edition, Unabridged (1961). Thus, the terms refer to any substance or media in which vegetation may take root and grow, and are intended to include not only earth but also compost, manure, muck, humus, sand and the like, adapted to support plant growth.

The compounds of the present invention can be prepared by (1) reacting an alkali metal salt of the substituted hydroxypyridine or thiopyridine with a substituted halogenated benzene or conversely by (2) reacting an alkali metal salt of a substituted phenol or thiophenol with a substituted halogenated pyridine. To facilitate preparation of the compounds, an inert solvent can be used.

Thus, in carrying out the process of this invention suitable halogenated benzenes which can be reacted with the thiopyridine or hydroxypyridine include dihalogenated benzenes, e.g., 1,2-difluorobenzene, 1,3-dichlorobenzene, 1-bromo-3-chlorobenzene, 1-fluoro-3-bromobenzene, 1-fluoro-4-chlorobenzene, 1-chloro-3-iodobenzene, and 1,4-dibromobenzene; trihalogenated benzenes, e.g., 1,2,3-trifluorobenzene, 1,3,5-trichlorobenzene and 1,2,4-tribromobenzene; tetrahalogenated benzenes, e.g., 1,2,3,5-tetrafluorobenzene, 1,2,4,6-tetrachlorobenzene and 1,2,3,4-tetrabromobenzene; pentahalogenated benzenes, e.g., 1,2,3,4,5-pentafluorobenzene, 1,2,3,5,6-pentachlorobenzene and 1,2,4,5,6-pentabromobenzene; and the hexahalogenated benzenes.

In addition to the use of the potassium salts of the various hydroxy-containing benzenes and pyridines, the sodium salt can also be used; however, the potassium salt is preferred because of its greater solubility in the solvents which are suitable for use in the process. Useful solvents are those which in addition to being inert in the process are sufficiently thermally stable at temperatures up to about 250° C. and yet are liquid at room temperature. Examples of such solvents are, in addition to diglyme, similar alkoxy ethyl ethers, pyrrolidone, N-alkylpyrrolidones such as N-methylpyrrolidone, and dialkylcarboxamides such as dimethylacetamide. In carrying out the process of this invention, the reaction mass is heated at temperatures of the order of about 100° C. to about 250° C. in order to complete the reaction.

As will be noted from a perusal of the illustrative examples given below, a catalyst is used, namely cuprous ion or a source of cuprous ion when the solvent is an alkoxyethyl ether. In addition to cuprous chloride other cuprous halides, cuprous oxide, cuprous salts of carboxylic acids, e.g., cuprous acetate, cuprous sulfate, copper metal and copper bronze can be used. Furthermore, the cupric counterparts of the aforementioned cuprous salts can also be used. Although potassium iodide is used in the illustrative examples its presence is not essential to the process; however, it is desirable to use potassium iodide or other source of iodine ion as a co-catalyst in order to minimize reaction time.

The following examples serve to illustrate the preparation of compounds of this invention. Parts are parts by weight.

EXAMPLE 2

Into a suitable reaction vessel there was charged 252 parts of 2,4-dibromophenol, 61 parts of 90% potassium hydroxide and 300 ml. of N-methylpyrrolidone. After the hydroxide had been added, 100 ml. of toluene was added and the resulting mixture heated to remove all water present. The toluene was then stripped and an additional 500 ml. of N-methylpyrrolidone was added. There was then charged 296 parts of 3,5-dichloropyridine and the reaction mixture was heated at 155° C.–160° C. for about eight hours, after which the temperature was raised to about 200° C. for an additional eight hours. The N-methylpyrrolidone and any unreacted materials were then stripped after which the crude product was purified in the usual manner to provide 3-(2',4'-dibromophenoxy)-5-chloropyridine, which had a boiling range of 159° C.–162° C. at 0.6 mm. of mercury and an index of refraction, $n_D^{25}$ of 1.6444.

EXAMPLE 3

Into a suitable reaction vessel there was charged 257.12 parts of m-chlorophenol and 122 parts of potassium hydroxide. After the hydroxide had dissolved 100 ml. of toluene was added and the mixture heated in order to remove the water present by azeotropic distillation. The toluene was then stripped and replaced with 200 ml. of diglyme. The resulting mixture was then slowly added to a mixture of 512 parts of 3,5-dichloropyridine, 100 ml. of diglyme, 6 parts of cuprous chloride and 4 parts of potassium iodide. The composite mixture was then heated at about 160° C.–165° C. for about 20 hours after which the product was obtained in the usual manner. The final product, 3-(3'-chlorophenoxy)-5-chloropyridine, was a colorless liquid, having an index of refraction, $n_D^{25}$ of 1.6003 and a boiling range of 127° C.–134° C. at 0.35 mm. of mercury.

In those cases where a polyhalogenated benzene or dihalogenated pyridine is used as halogen-containing reactant, the resulting product will be a mixture of the compounds claimed herein unless the halogens are symmetrically placed so that regardless of which halogen reacts the same product is formed.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. Composition comprising an adjuvant and herbicidal effective amount of at least one compound selected from the group consisting of a pyridine base and acid addition salts thereof, said pyridine base having the formula

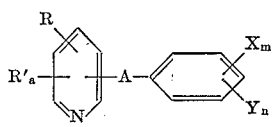

wherein A is selected from the group consisting of O and S; X and Y are each selected from the group consisting of fluorine, chlorine and bromine; R is selected from the group consisting of fluorine, bromine, and chlorine; R' is selected from the group consisting of chlorine, bromine, and fluorine; $a$ is one of the integers 0 or 1; $m$ is one of the integers 0 to 3; and $n$ is one of the integers 1 or 2.

2. Composition of claim 1 in which the herbicidal compound is the pyridine base.

3. Composition of claim 2 in which the herbicidal compound is of the formula

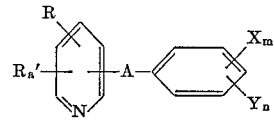

wherein A is oxygen; X and Y are each selected from the group consisting of chloro and bromo; R is selected from the group consisting of chloro, and bromo; R' is selected from the group consisting of chloro and bromo; and the sum of $m$ plus $n$ is a maximum of three.

4. Composition of claim 3 in which $a$ is zero.

5. Composition of claim 4 in which R is in the 5-position.

6. Composition of claim 5 in which the herbicidal compound is 3-(3'-chlorophenoxy)-5-chloropyridine.

7. Composition of claim 4 in which R is in the 2-position.

8. Composition of claim 7 in which the herbicidal compound is 4-(3'-chlorophenoxy)-2-bromopyridine.

9. Composition of claim 7 in which the heribicdal compound is 4-(3'-chlorophenoxy)-2-chloropyridine.

10. Composition of claim 7 in which the herbicidal compound is 4 - (2',4',5' - trichlorophenoxy)-2-chloropyridine.

11. Method which comprises exposing a plant to a herbicidal effective amount of at least one compound selected from the group consisting of a pyridine base and acid addition salts thereof, said pyridine base having the formula

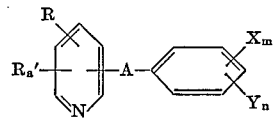

wherein A is selected from the group consisting of O and S; X and Y are each selected from the group consisting of fluorine, chlorine and bromine; R is selected from the group consisting of fluorine, bromine, and chlorine; R' is selected from the group consisting of chlorine, bromine, and fluorine; $a$ is one of the integers 0 or 1; $m$ is one of the integers 0 to 3; and $n$ is one of the integers 1 or 2.

12. Method according to claim 11 in which the herbicidal compound is the pyridine base.

13. Method according to claim 11 in which the herbicidal compound is of the formula

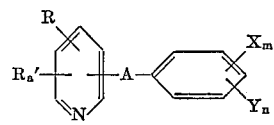

wherein A is oxygen; X and Y are each selected from the group consisting of chloro and bromo; R is selected from the group consisting of chloro, and bromo; R' is selected from the group consisting of chloro and bromo; and the sum of $m$ plus $n$ is a maximum of three.

References Cited
UNITED STATES PATENTS
3,429,689, 2/1969 Duerr et al. _____ 71—94

JAMES O. THOMAS, JR., Primary Examiner

U.S. Cl. X.R.

71—76, 92, 93; 260—297